US011374752B2

(12) United States Patent
Nakano (10) Patent No.: US 11,374,752 B2
(45) Date of Patent: Jun. 28, 2022

(54) SECURE TRANSACTIONS FOR IN-FLIGHT ENTERTAINMENT SYSTEMS

(71) Applicant: Panasonic Avionics Corporation, Lake Forest, CA (US)

(72) Inventor: Hideo Nakano, Irvine, CA (US)

(73) Assignee: PANASONIC AVIONICS CORPORATION, Lake Forest, CA (US)

( * ) Notice: Subject to any disclaimer, the term of this patent is extended or adjusted under 35 U.S.C. 154(b) by 282 days.

(21) Appl. No.: 16/434,954

(22) Filed: Jun. 7, 2019

(65) Prior Publication Data

US 2020/0389307 A1 Dec. 10, 2020

(51) Int. Cl.
*H04L 9/14* (2006.01)
*H04L 9/32* (2006.01)
(Continued)

(52) U.S. Cl.
CPC ............... *H04L 9/14* (2013.01); *G06F 7/725* (2013.01); *G06Q 20/3255* (2013.01);
(Continued)

(58) Field of Classification Search
CPC .... G06Q 20/322; G06Q 20/40; G06Q 20/401; G06Q 20/202; G06Q 20/3276;
(Continued)

(56) References Cited

U.S. PATENT DOCUMENTS 8,326,282 B2 * 12/2012 Margis ............... H04N 21/4126
455/431
8,489,090 B2 7/2013 Rooks et al.
(Continued)

FOREIGN PATENT DOCUMENTS

CA        2841685 A1 *  9/2014   ......... H04N 21/2146
WO   WO-2017222129 A1 * 12/2017   ............. G06Q 10/06
WO      2019053240       3/2019

OTHER PUBLICATIONS

Chochliouros, I. et al., Use Case #3: Next-Generation integrated in-flight connectivity and entertainment systems, Embedded Network Service for 5G Experiences, published Jan. 6, 2017.

*Primary Examiner* — Tae K Kim
(74) *Attorney, Agent, or Firm* — Perkins Coie LLP (57) ABSTRACT

Disclosed are devices, systems and methods for performing secure transactions in an aircraft are disclosed. Embodiments of the disclosed technology enable low cost carriers to provide payment verification for on-board purchases via the in-flight entertainment system. An exemplary method for performing secure transactions in an aircraft includes transmitting, by a user device in the aircraft using a wireless protocol, a first authentication factor and a request for one or more on-board services; receiving, from an on-board transceiver using the wireless protocol, an authentication token (a) comprising a one-time code and (b) encrypted using an asymmetric cryptographic algorithm; transmitting, using the asymmetric cryptographic algorithm, a second authentication factor comprising (a) the authentication token and (b) a text message transmitted from the user device; and receiving a confirmation of a delivery of the one or more on-board services.

20 Claims, 8 Drawing Sheets

(51) Int. Cl.
*H04L 9/08* (2006.01)
*G06Q 20/40* (2012.01)
*H04L 9/30* (2006.01)
*G06Q 20/32* (2012.01)
*G06F 7/72* (2006.01)

(52) U.S. Cl.
CPC ......... *G06Q 20/401* (2013.01); *H04L 9/0825* (2013.01); *H04L 9/0844* (2013.01); *H04L 9/302* (2013.01); *H04L 9/3228* (2013.01)

(58) Field of Classification Search
CPC .......... G06Q 20/3674; G06Q 20/4012; G06Q 20/027; G06Q 20/4014; G06Q 20/425; G06Q 20/326; G06Q 20/02; H04L 63/0428; H04L 63/08; H04L 63/0853; H04L 63/0281; H04L 63/0807; H04L 63/10; H04L 63/18; H04L 9/3213; H04L 9/0825; H04L 9/32; H04L 9/0863; H04L 9/321; H04L 67/12; H04L 67/125; H04L 67/18; H04L 67/327; H04L 2209/56
See application file for complete search history.

(56) References Cited

U.S. PATENT DOCUMENTS

| | | | |
|---|---|---|---|
| 8,868,069 B2 | 10/2014 | Bennett et al. | |
| 9,016,627 B2* | 4/2015 | Margis | B64D 11/0015 244/118.6 |
| 9,582,800 B2* | 2/2017 | Dierickx | G06Q 20/38215 |
| 9,872,154 B2* | 1/2018 | Margis | H04W 4/06 |
| 9,924,203 B2* | 3/2018 | Igarashi | H04N 21/2542 |
| 10,075,437 B1* | 9/2018 | Costigan | H04L 63/166 |
| 10,484,466 B2* | 11/2019 | Gummig | H04L 65/4084 |
| 10,499,114 B2* | 12/2019 | Slater | H04N 21/44004 |
| 10,958,724 B2* | 3/2021 | Naneix | H04L 67/1095 |
| 2009/0081947 A1* | 3/2009 | Margis | H04N 21/4363 455/3.02 |
| 2012/0259774 A1* | 10/2012 | Marti | H04M 17/00 705/41 |
| 2012/0267432 A1* | 10/2012 | Kuttuva | G06Q 20/3276 235/379 |
| 2012/0298737 A1* | 11/2012 | Thakar | B64D 11/0015 235/375 |
| 2013/0024379 A1* | 1/2013 | Di Tucci | G06Q 20/3255 705/44 |
| 2013/0059574 A1* | 3/2013 | Fighel | H04W 4/16 455/417 |
| 2013/0160060 A1* | 6/2013 | Margis | H04W 4/06 725/75 |
| 2014/0007196 A1* | 1/2014 | Lin | H04W 12/069 726/4 |
| 2014/0058951 A1* | 2/2014 | Kuppuswamy | G06Q 20/3827 705/67 |
| 2014/0164254 A1* | 6/2014 | Dimmick | G06Q 20/36 705/44 |
| 2014/0282747 A1* | 9/2014 | Richman | H04W 76/15 725/62 |
| 2015/0310438 A1* | 10/2015 | Kassemi | G06Q 20/10 705/44 |
| 2016/0007169 A1* | 1/2016 | Margis | H04N 21/4782 370/329 |
| 2016/0226574 A1* | 8/2016 | LaMarca | H04B 7/18508 |
| 2016/0328707 A1* | 11/2016 | Wagner | G06Q 20/322 |
| 2017/0024732 A1* | 1/2017 | Pandey | G06Q 20/401 |
| 2017/0148018 A1* | 5/2017 | Levin | G06Q 20/3829 |
| 2017/0213220 A1* | 7/2017 | Tomlinson, Jr. | H04L 63/08 |
| 2018/0027465 A1* | 1/2018 | Karlsson | H04W 92/12 370/331 |
| 2018/0108104 A1* | 4/2018 | Keen | G06Q 50/30 |
| 2018/0174137 A1* | 6/2018 | Subbarayan | G06Q 20/02 |
| 2018/0198774 A1* | 7/2018 | Pitel | H04L 63/0861 |
| 2018/0330368 A1* | 11/2018 | Slupesky | G06Q 20/3823 |
| 2019/0311625 A1* | 10/2019 | Anvari | G08G 1/165 |

* cited by examiner

SECURE TRANSACTIONS FOR IN-FLIGHT ENTERTAINMENT SYSTEMS

TECHNICAL FIELD

This document is directed generally to in-flight entertainment (IFE) networks and systems, and in particular, to secure payments using IFE systems.

BACKGROUND

Air travel typically involves journeys over extended distances that at the very least take several hours to complete, and airlines therefore provide on-board in-flight entertainment (IFE) systems that offer a wide variety of multimedia content and other on-board services (e.g., food, games, etc.) for passenger enjoyment. Payment verification for on-board content and services is an integral part of current and future IFE systems.

SUMMARY

Methods and systems described in the present document advantageously enable low cost carriers to provide payment verification for on-board purchases via the in-flight entertainment system. In an example, this is achieved by using, for example, an on-board Fifth Generation (5G) cellular picocell that can connect a user's mobile device to a ground network using the 5G cellular communication protocol.

In one exemplary aspect, a method for securely processing transactions in an aircraft is disclosed. The method includes transmitting, by a user device in the aircraft using a wireless protocol, a first authentication factor and a request for one or more on-board services; receiving, from an on-board transceiver using the wireless protocol, an authentication token (a) comprising a one-time code and (b) encrypted using an asymmetric cryptographic algorithm; transmitting, using the asymmetric cryptographic algorithm, a second authentication factor comprising (a) the authentication token and (b) a text message transmitted from the user device; and receiving a confirmation of a delivery of the one or more on-board services, where the on-board transceiver is operable to relay the first authentication factor and the second authentication factor to a ground network using the wireless protocol.

In another exemplary aspect, a method for securely processing transactions in an aircraft is disclosed. The method includes receiving, from a user device in an aircraft using a wireless protocol, a request for one or more on-board services; transmitting, by an on-board transceiver using the wireless protocol, a request for payment; relaying, from the user device to a ground network using the wireless protocol, a first authentication factor; relaying, from the ground network to the user device, an authentication token comprising a one-time code, wherein the authentication token is encrypted using an asymmetric cryptographic algorithm; relaying, from the user device to the ground network, a second authentication factor that (a) is encrypted using the asymmetric cryptographic algorithm and (b) comprises a text message transmitted from the user device and the authentication token; receiving, from the ground network, a payment authorization; and transmitting, to the user device in response to receiving the payment authorization, a confirmation of a delivery of the one or more on-board services.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

Air travel typically involves journeys over extended distances that at the very least take several hours to complete. Some of the longer non-stop international flights have scheduled durations of over sixteen hours with travel distances extending beyond ten thousand miles. Passengers on board the aircraft are confined within an enclosed space of a designated seat for the entire duration of the flight, with only a few limited opportunities to leave the seat for use of the lavatory and so forth. Thus, even on the shortest trips an airline passenger has some idle time, which the passenger may occupy with work, leisure, and/or rest.

Airlines therefore provide on-board in-flight entertainment (IFE) systems that offer a wide variety of multimedia content for passenger enjoyment. Recently released movies are a popular viewing choice, as are television shows such as news programs, situation and stand-up comedies, documentaries, and so on. IFE systems also allow passengers to purchase items from on-board product catalogs (e.g., SkyMall), including some items which can be used during the flight itself.

On-board content, products and services require verification of payment information, which is an integral part of current and future IFE systems, and relies on connectivity to the ground since most passengers pay using credit cards (which require verification via one or more servers on the ground). This may prove to be a non-trivial barrier for IFE implementation to low-cost carriers, which may not be able to afford the expenses incurred by IFE equipment, both for installation as well as connectivity to the ground, which is achieved via satellite relays and/or ground towers.

Some embodiments for on-board communication use a 5G picocell in the passenger cabin to enable a passenger to use their mobile phone (or mobile device, or device) in the aircraft. In an example, a 5G picocell can accommodate up to 100 users at a time at ranges under 200 meters. This on-board mobile device use is supported by the 5G picocell acting like a cell tower, transmitting the signals received from the mobile device to a satellite, which then relays it to the ground stations, or directly to a ground tower. In an example, this system may be used to perform payment verification using two-factor authentication for the on-board content, products and services. This system relies upon roaming agreements established with local cellular providers on the ground for connectivity over cellular networks. However, the installation and maintenance of this type of system may be prohibitively expensive, in part due to equipment and connectivity costs.

Figure 1:
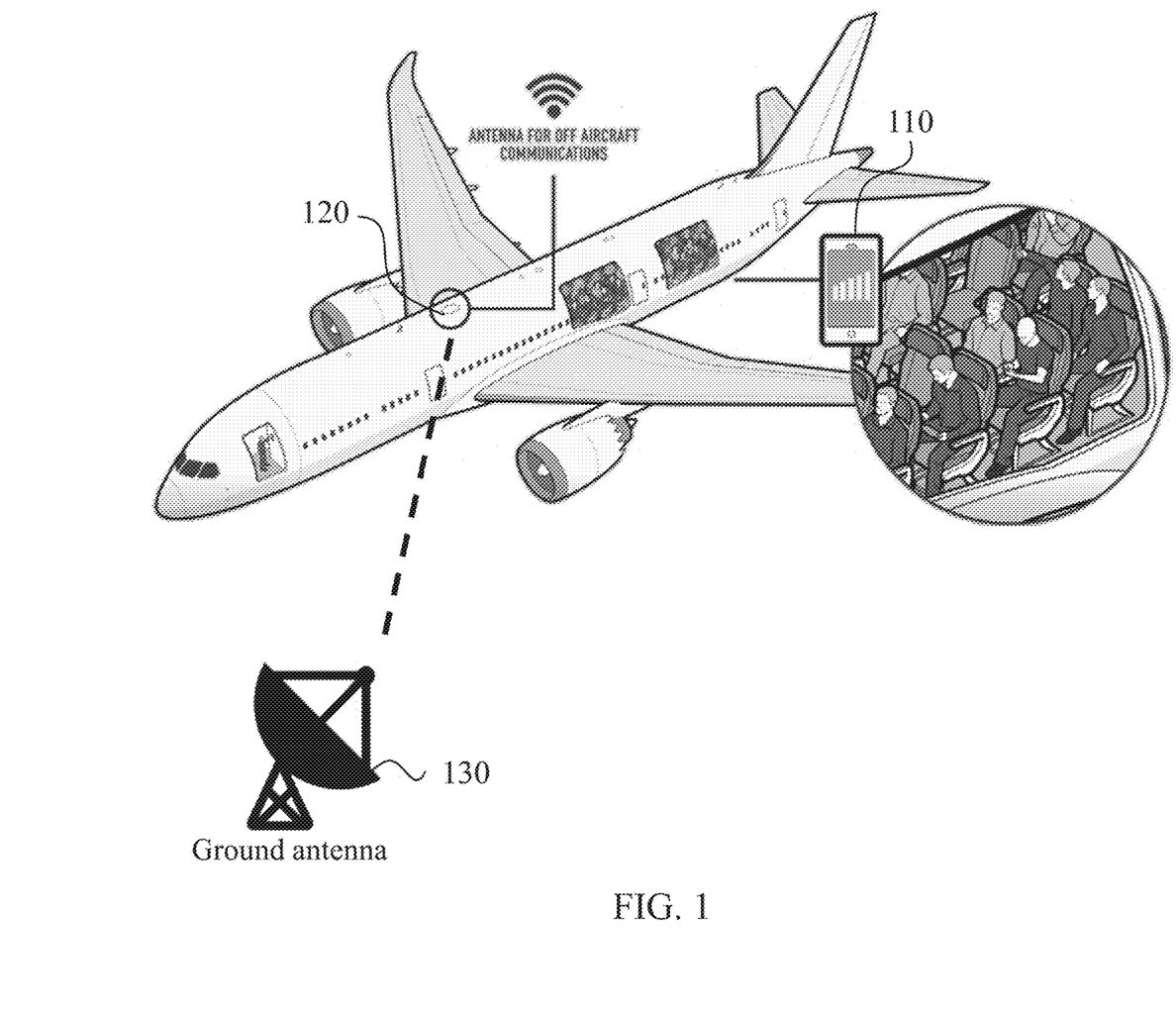
FIG. 1 shows an example of a system that provides payment verification on an aircraft, in accordance with embodiments of the disclosed technology.

Embodiments of the disclosed technology provide a more cost-effective solution for on-board payment verification using two-factor authentication based on direct connectivity between the airplane and the ground towers, as shown in FIG. 1. In an example, a user device 110 is able to communicate with a 5G picocell in the cabin of the airplane (not shown in FIG. 1), which is configured to relay those communications (e.g., payment verification messages) via an on-board transceiver 120 to the ground antenna (or system) 130. Typically, the ground antenna is mounted on a tower for establishing a communication link with an antenna mounted to an aircraft in range of the tower.

In some embodiments, the on-board transceiver may comprise an external antenna (e.g., located at the bottom of the airplane) for the 5G picocell that is used to close the link to the ground antenna. In an example, the ground antenna may include a 5G router that is capable of achieving speeds up to 4 Gbps. This would ensure that small amounts of data (e.g., text messages, payment verification information, credit card numbers, emails and apps with high-resolution images stripped out) could be robustly communicated between the ground antenna 230 and an aircraft cruising at 20,000 feet.

Using the 5G communication protocol advantageously ensures that the link between the ground antenna and the external antenna (not shown in FIG. 1) can be maintained for overland flights (e.g., over the continental US), thereby providing a cost-effective solution to providing on-board content, products and services that can be securely paid for based on embodiments of the disclosed technology.

In other embodiments, the on-board transceiver may comprise an external Ultra/Very High-Frequency (UHF/VHF) antenna that is coupled to the 5G picocell located inside the cabin of the aircraft. For example, the data from user devices would be communicated using the 5G protocol to the on-board picocell, and then transformed to waveforms that could be transmitted via the UHF/VHF antenna to the ground antenna.

Figure 2:
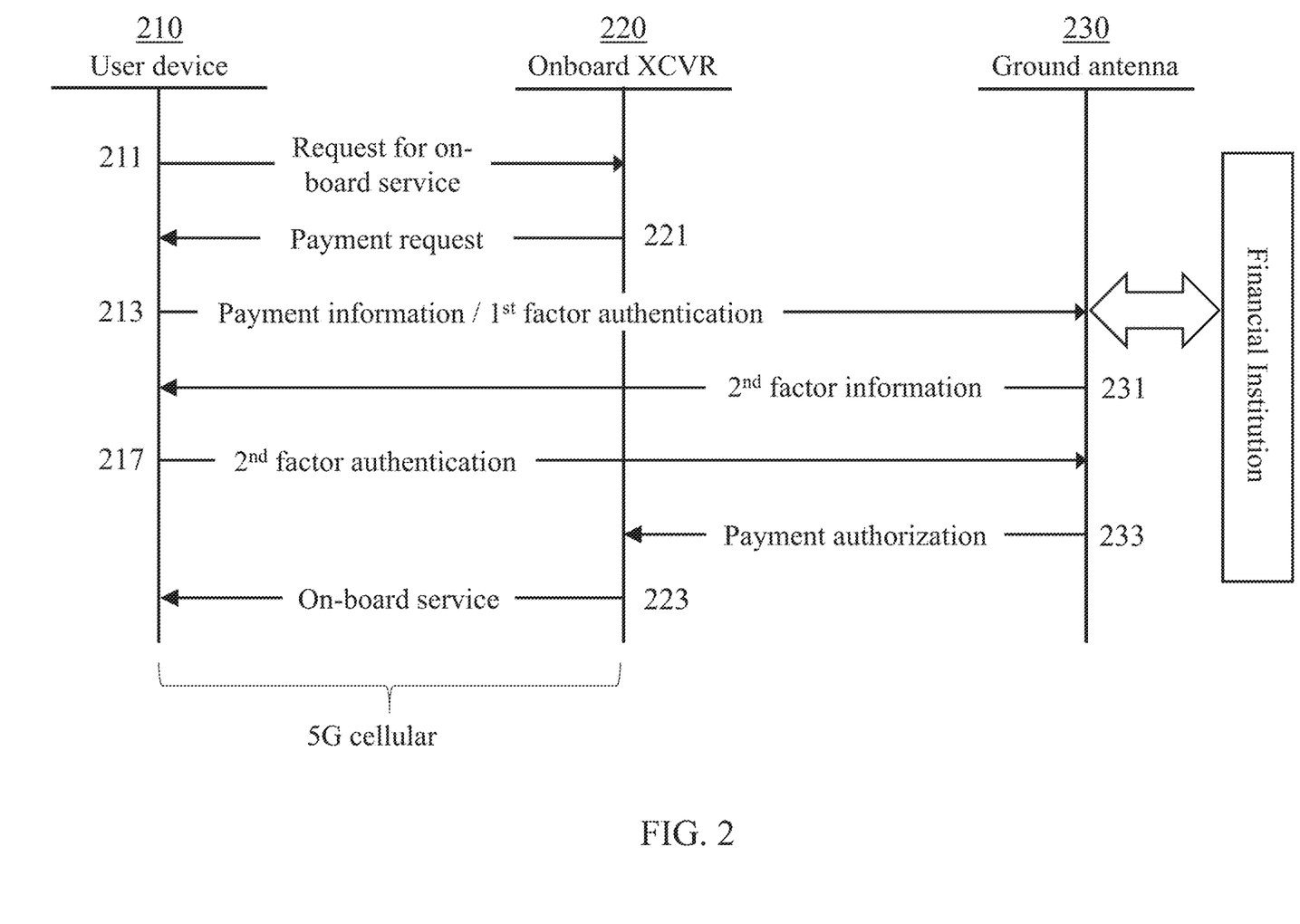
FIG. 2 shows an example of a messaging protocol, in accordance with embodiments of the disclosed technology.

FIG. 2 shows an example of a messaging protocol to provide payment verification for on-board purchases via the in-flight entertainment system. As shown therein, messages are communicated between a user (mobile) device 210, an on-board transceiver 220 and a ground antenna (or ground tower, or ground network) 230. It is assumed that the ground network is in communication with a financial institution 250 that the user has an account with, and those messages are not explicitly discussed in the context of FIG. 2.

The secure payment verification process for on-board purchases via the in-flight entertainment system begins with a request (211) for on-board services by the user 210 to the on-board transceiver 220. In an example, the request may include a request for content (e.g., on-demand movies or pay-per-view television), products (e.g., from SkyMall) or services. This request for services to the on-board transceiver 220 is followed by the on-board transceiver transmitting a request for payment (221) to the user device 210.

The user device may then transmit payment information and/or a first authentication factor (213), which is relayed by the on-board transceiver 220 to the ground network 230. In an example, the first authentication factor may include a credit card number or ACH (Automated Clearing House) payment information. In another example, the credit card number that is transmitted from the user device 210 to the ground network 230 (and eventually to the financial institution 250) is encrypted using a symmetric cryptographic algorithm, whose keys are known only to the user device 210 and the financial institution 250. Herein, the on-board transceiver 220 and the ground network 230 serve as relays, but cannot access the contents of the packets (213) that are being transmitted from the user device to the financial institution.

In an example, the embodiment described in FIG. 2 uses one-time codes in SMS or text messages as the second factor in the two-factor authentication system. Thus, the process for payment verification for on-board purchases via the in-flight entertainment system continues with the financial institution (or in some cases, a proxy for the financial institution) transmitting the second factor information (231) to the user device. In an example, the second factor information may include a one-time alphanumeric sequence that is relayed from the financial institution 250, via the ground network 230 and on-board transceiver 220, to the user device 210 in a SMS/text message.

Having received the second factor information, the user device 210 now transmits the second authentication factor (217) back to the financial institution 250, via on-board transceiver 220 and ground network 230. In an example, the second authentication factor is the one-time alphanumeric sequence that was just received from the financial institution. In other words, the two-factor authentication system ensures that the user has knowledge (the credit card number known only to the user and not linked to the user device 210) and possession (the user device 210 which receives the one-time alphanumeric sequence), which verifies that the payment provided by the user is legitimate remuneration for the on-board services requested.

In some embodiments, the messages between the user device 210 and the ground network 230 (e.g., 213, 231 and 217) may be communicated using only the 5G protocol or a combination of the 5G protocol and UHF/VHF communications.

The financial institution 250 informs the on-board transceiver 220, via the ground network 230, that the payment is authorized (233), and the process is completed by the on-board transceiver 220 providing the on-board service (e.g., the on-demand movie or pay-per-view TV event) or a confirmation of the on-board service (e.g., a receipt for a SkyMall purchase that can be picked up once the aircraft has landed).

Figure 3A:
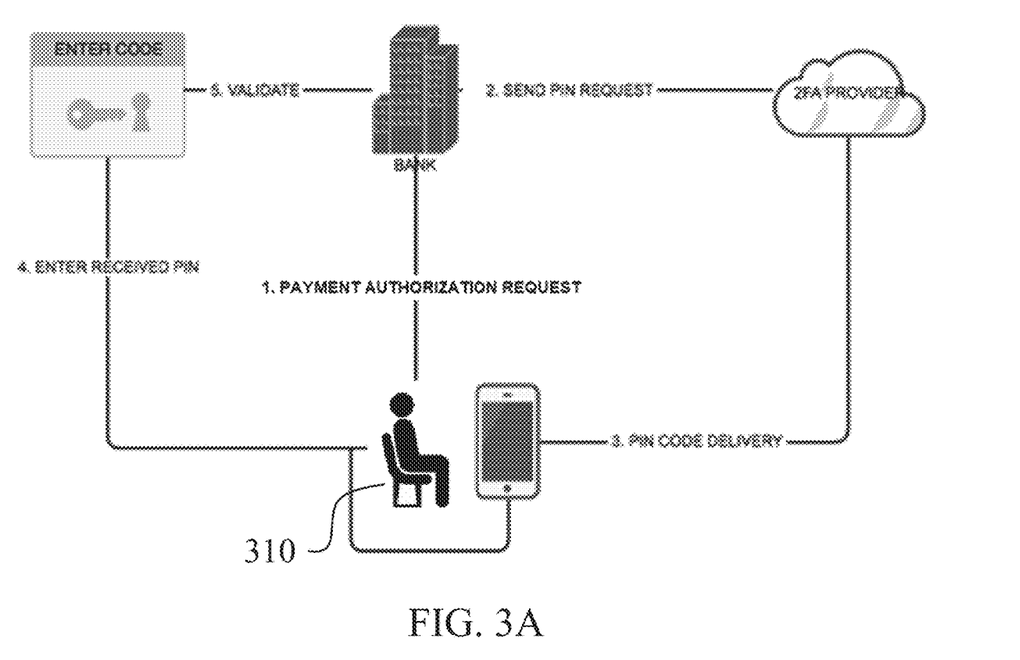
FIGS. 3A and 3B show examples of intended and subverted two-factor authentication (2FA) operations, respectively.
Figure 3B:
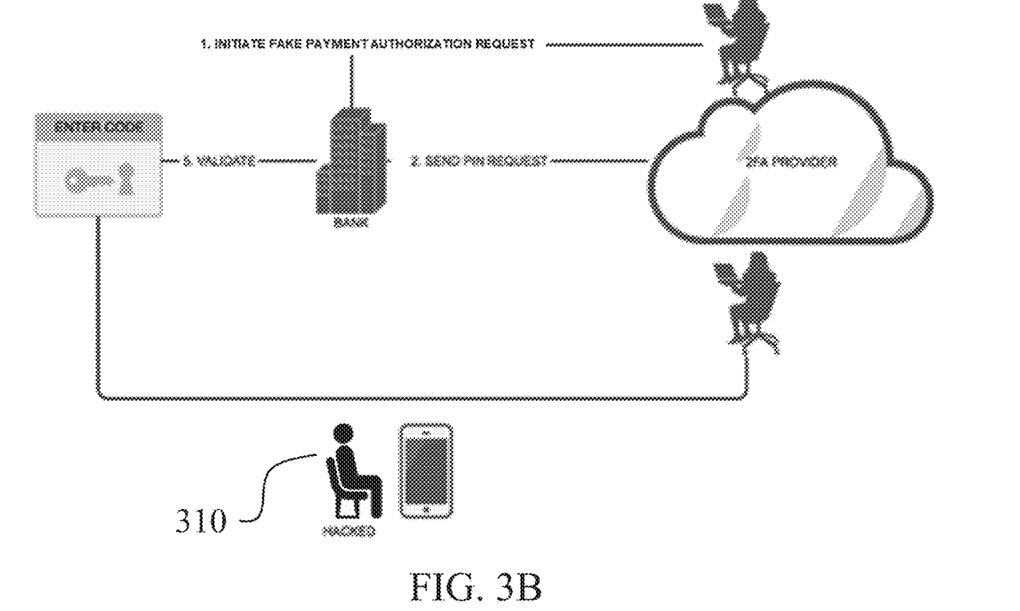

FIGS. 3A and 3B show examples of intended and subverted two-factor authentication (2FA) operations, respectively, and provide the motivation for embodiments of the disclosed technology using secure text/SMS communications. Most financial institutions provide two-factor authentication (2FA), but typically do not provide their own implementations for these secure IT services. Normally, a financial institution partners with a third-party 2FA provider that serves the financial institution's customers.

As shown in FIG. 3A, the normal operation of 2FA provides the intended verification so as to avoid fraudulent charges, etc., and works as follows:

The user 310 requests payment authorization via the on-board request and providing payment information to the on-board transceiver;

The financial institution receives this request via the on-board transceiver and ground network, and requests 2FA provider to generate a PIN (e.g., the alphanumeric sequence);

The user in the aircraft receives the PIN via a text or SMS message;

The user in the aircraft enters the PIN; and

The financial institution validates the codes and provides confirmation to the on-board transceiver that the content, products and/or services may be delivered.

However, since SMS/text messages are typically not secured or encrypted, a person working for the 2FA provider is able to see all the personal information related to the user on the aircraft. Alternatively, text or SMS messages may be intercepted or hijacked (e.g., a cell tower may be spoofed by transmitted high-power messages of the intended format). An exemplary attack scenario is shown in FIG. 3B, wherein:

A person Y (different from the user 310 on the aircraft) initiates a purchase or request requiring payment verification;

Person Y intercepts the code sent by the 2FA; and

Person Y begins charging the account of the user on the aircraft.

Thus, embodiments of the disclosed technology use a cryptographic algorithm to encrypt the messages that are sent between the user and the financial institution (e.g., 213, 231 and 217 in FIG. 2). This ensures that payment verification will operate as intended.

In some embodiments, and as described earlier, the credit card information (or more generally, the first authentication factor) may be encrypted using a symmetric cryptographic algorithm. For example, the symmetric cryptographic algorithm may include one of an Advanced Encryption Standard (AES) cipher, an RC4 stream cipher or a Twofish block cipher.

In some embodiments, the second authentication factor (e.g., the text or SMS message) may be encrypted using asymmetric cryptographic algorithms, also known as public-private key pair cryptography. For example, the asymmetric cryptographic algorithm may include one of a Diffie-Hellman key exchange protocol, a cryptosystem based on elliptic curves, an RSA encryption algorithm or a Paillier cryptosystem.

Figure 4:
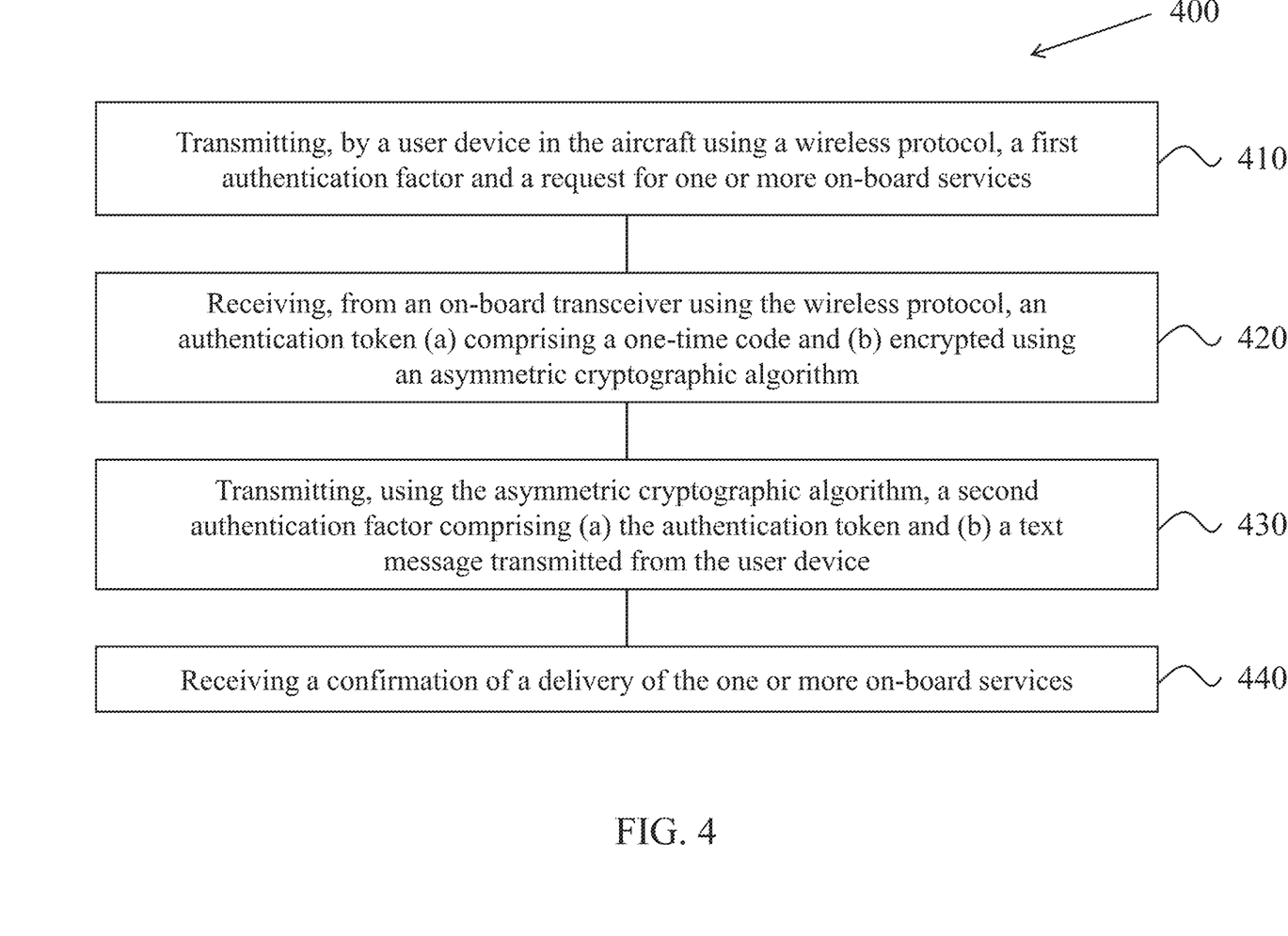
FIG. 4 shows a flowchart of an example method for performing secure transactions in an aircraft, in accordance with embodiments of the disclosed technology.

FIG. 4 shows a flowchart for an example of a method for performing secure transactions in an aircraft. The method 400 includes, at step 410, transmitting, by a user device in the aircraft using a wireless protocol, a first authentication factor and a request for one or more on-board services.

The method 400 includes, at step 420, receiving, from an on-board transceiver using the wireless protocol, an authentication token (a) comprising a one-time code and (b) encrypted using an asymmetric cryptographic algorithm.

The method 400 includes, at step 430, transmitting, using the asymmetric cryptographic algorithm, a second authentication factor comprising (a) the authentication token and (b) a text message transmitted from the user device.

The method 400 includes, at step 440, receiving a confirmation of a delivery of the one or more on-board services. In some embodiments, the on-board transceiver is operable to relay the first authentication factor and the second authentication factor to a ground network using the wireless protocol.

In some embodiments, the first authentication factor is a credit card number. In an example, the first authentication factor is encrypted using a symmetric cryptographic algorithm.

In some embodiments, the method 400 further includes the step of receiving, from the on-board transceiver, a request for payment.

In some embodiments, the wireless protocol is a Fifth Generation (5G) cellular protocol, and wherein the on-board transceiver comprises a 5G picocell.

Figure 5A:
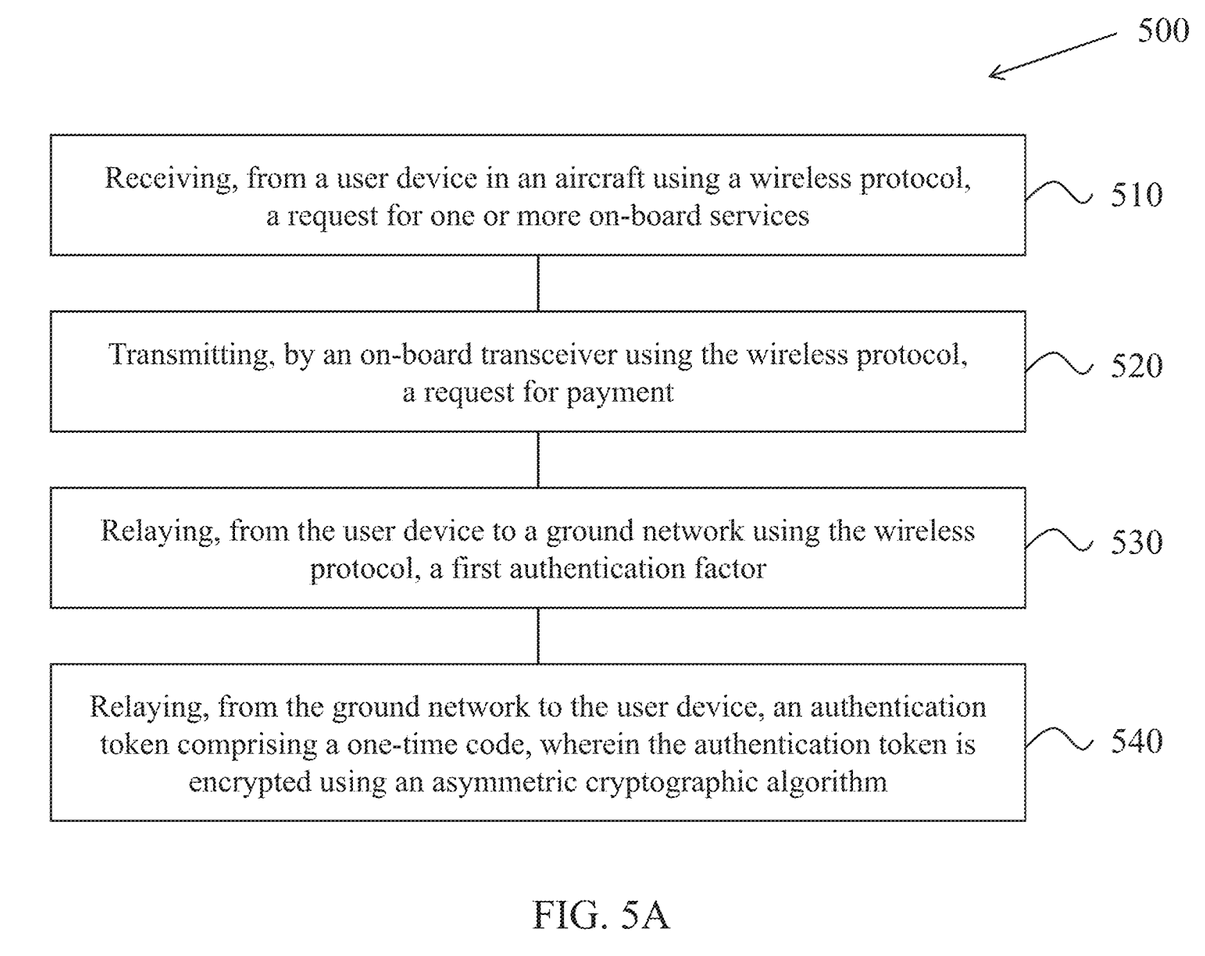
FIGS. 5A and 5B show a flowchart of another example method for performing secure transactions in an aircraft, in accordance with embodiments of the disclosed technology.
Figure 5B:
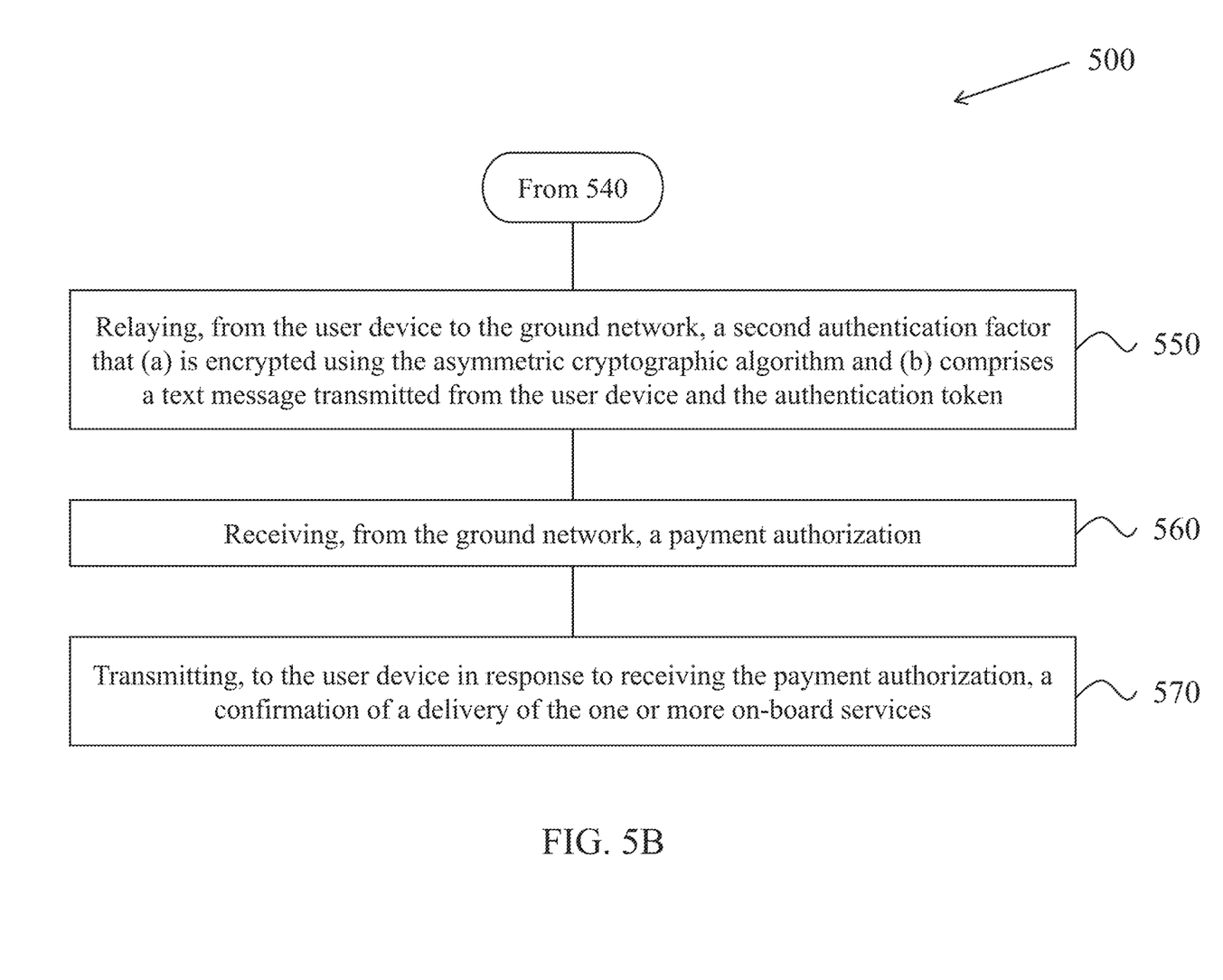

FIGS. 5A and 5B show a flowchart for another example of a method for performing secure transactions in an aircraft. The method 500 includes, at step 510, receiving, from a user device in an aircraft using a wireless protocol, a request for one or more on-board services.

The method 500 includes, at step 520, transmitting, by an on-board transceiver using the wireless protocol, a request for payment.

The method 500 includes, at step 530, relaying, from the user device to a ground network using the wireless protocol, a first authentication factor. In some embodiments, the first authentication factor is a credit card number that is encrypted using a symmetric cryptographic algorithm.

The method 500 includes, at step 540, relaying, from the ground network to the user device, an authentication token comprising a one-time code, where the authentication token is encrypted using an asymmetric cryptographic algorithm.

The method 500 includes, at step 550, relaying, from the user device to the ground network, a second authentication factor that (a) is encrypted using the asymmetric cryptographic algorithm and (b) comprises a text message transmitted from the user device and the authentication token.

The method 500 includes, at step 560, receiving, from the ground network, a payment authorization.

The method 500 includes, at step 570, transmitting, to the user device in response to receiving the payment authorization, a confirmation of a delivery of the one or more on-board services. In some embodiments, the wireless protocol is a Fifth Generation (5G) cellular protocol, and wherein the on-board transceiver comprises a 5G picocell.

Embodiments of the disclosed technology provide devices for securely processing transactions in an aircraft. In an example, an apparatus for securely processing transactions in an aircraft includes a processor, and a non-transitory memory with instructions thereon, wherein the instructions upon execution by the processor cause the processor to: receive, from a user device in an aircraft using a wireless protocol, a request for one or more on-board services; transmit, by an on-board transceiver using the wireless protocol, a request for payment; relay, from the user device to a ground network using the wireless protocol, a first authentication factor; relay, from the ground network to the user device, an authentication token comprising a one-time code, wherein the authentication token is encrypted using an asymmetric cryptographic algorithm; relay, from the user device to the ground network, a second authentication factor that (a) is encrypted using the asymmetric cryptographic algorithm and (b) comprises a text message transmitted from the user device and the authentication token; receive, from the ground network, a payment authorization; and transmit, to the user device in response to receiving the payment authorization, a confirmation of a delivery of the one or more on-board services.

In some embodiments, the first authentication factor is encrypted using a symmetric cryptographic algorithm comprising one of an Advanced Encryption Standard (AES) cipher, an RC4 stream cipher or a Twofish block cipher.

In some embodiments, the wireless protocol is a Fifth Generation (5G) cellular protocol, and wherein the on-board transceiver comprises a 5G picocell. In an example, the ground network comprises a 5G router.

In some embodiments, the asymmetric cryptographic algorithm comprises one of a Diffie-Hellman key exchange protocol, a cryptosystem based on elliptic curves, an RSA encryption algorithm or a Paillier cryptosystem.

Embodiments of the disclosed technology provide non-transitory computer-readable media having data stored therein representing software executable by a computer, the software comprising instructions for securely processing transactions in an aircraft. In an example, the non-transitory computer-readable medium includes instructions for transmitting, by a user device in the aircraft using a wireless protocol, a first authentication factor and a request for one or more on-board services, wherein the first authentication factor is encrypted using a first cryptographic algorithm; instructions for receiving, from an on-board transceiver using the wireless protocol, an authentication token (a) comprising a one-time code and (b) encrypted using a second cryptographic algorithm; instructions for transmitting, using the second cryptographic algorithm, a second authentication factor comprising (a) the authentication token and (b) a text message transmitted from the user device; and instructions for receiving a confirmation of a delivery of the one or more on-board services. In some embodiments, the on-board transceiver is operable to relay the first authentication factor and the second authentication factor to a ground network using the wireless protocol.

In some embodiments, the first authentication factor is a credit card number.

In some embodiments, the non-transitory computer-readable medium further comprises instructions for receiving, from the on-board transceiver, a request for payment.

In some embodiments, the wireless protocol is a Fifth Generation (5G) cellular protocol, wherein the on-board transceiver comprises a 5G picocell, and wherein the ground network comprises a 5G router.

In some embodiments, (a) the first cryptographic algorithm comprises a symmetric cryptographic algorithm and the second cryptographic algorithm comprises an asymmetric cryptographic algorithm, or (b) the first and second cryptographic algorithms comprise a symmetric cryptographic algorithm, or (c) the first and second cryptographic algorithms comprise an asymmetric cryptographic algorithm, or (d) the first cryptographic algorithm comprises an asymmetric cryptographic algorithm and the second cryptographic algorithm comprises a symmetric cryptographic algorithm. In an example, the symmetric cryptographic algorithm comprises one of an Advanced Encryption Standard (AES) cipher, an RC4 stream cipher or a Twofish block cipher. In another example, the asymmetric cryptographic algorithm comprises one of a Diffie-Hellman key exchange protocol, a cryptosystem based on elliptic curves, an RSA encryption algorithm or a Paillier cryptosystem.

Figure 6A:
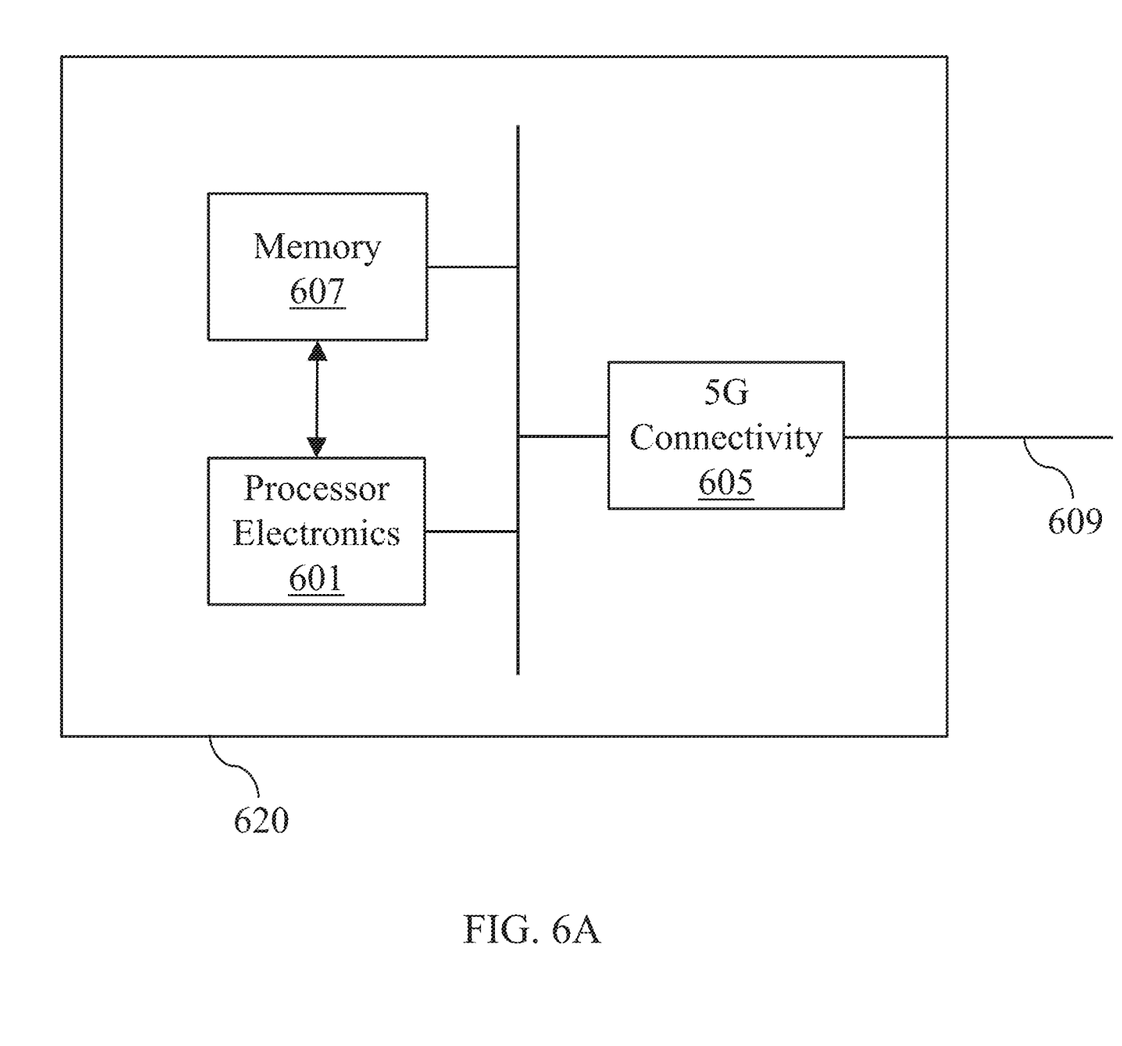
FIGS. 6A and 6B show block diagrams of exemplary devices that can implement embodiments of the disclosed technology.

FIG. 6A is a block diagram representation of a portion of a device 620-1 that can be used to implement the methods and embodiments described herein. The device 620-1 can include processor electronics 601 such as a microprocessor that implements one or more of the techniques (including, but not limited to, methods 400 and 500) presented in this document. The device 620-1 can include 5G connectivity capabilities 605 to send and/or receive data over one or more wireless communication interfaces and channels 609. Device 620-1 can include one or more memories 607 configured to store information such as data and/or instructions. In some implementations, the processor electronics 601 can include at least a portion of the 5G connectivity capabilities 605. In some embodiments, at least some of the disclosed techniques, modules or functions are implemented using the device 620-1.

Figure 6B:
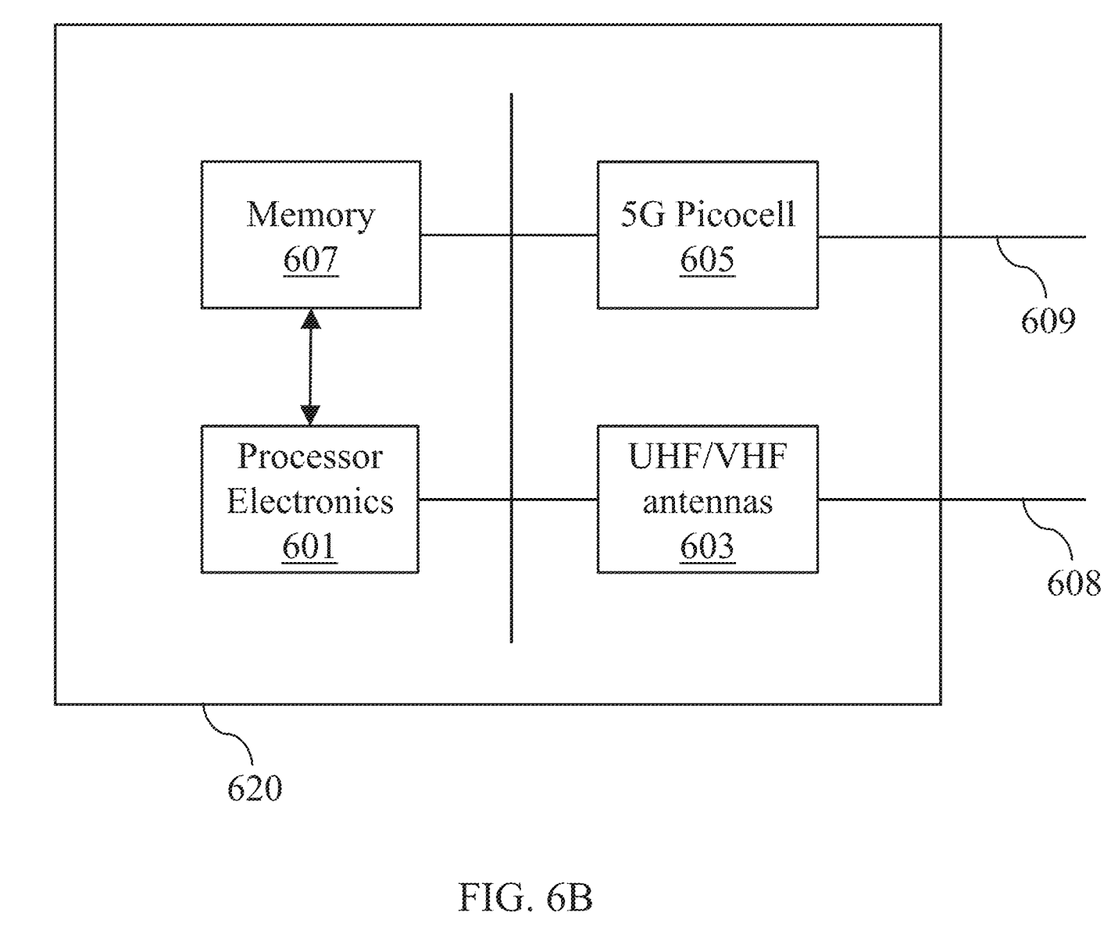

FIG. 6B is a block diagram representation of a portion of another device 620-2 that can be used to implement the methods and embodiments described herein. The device 620-2 can include processor electronics 601 such as a microprocessor that implements one or more of the techniques (including, but not limited to, methods 400 and 500) presented in this document. The device 620-2 can include 5G connectivity capabilities 605 and UHF/VHF antennas 603 to send and/or receive data over one or more wireless communication interfaces and channels 609 and 608, respectively. Device 620-2 can include one or more memories 607 configured to store information such as data and/or instructions. In some implementations, the processor electronics 601 can include at least a portion of the 5G connectivity capabilities 605. In some embodiments, at least some of the disclosed techniques, modules or functions are implemented using the device 620-2.

It is intended that the specification, together with the drawings, be considered exemplary only, where exemplary means an example and, unless otherwise stated, does not imply an ideal or a preferred embodiment. As used herein, the singular forms "a", "an" and "the" are intended to include the plural forms as well, unless the context clearly indicates otherwise. Additionally, the use of "or" is intended to include "and/or", unless the context clearly indicates otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that are known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described, and other implementations, enhancements and variations can be made based on what is described and illustrated in this patent document.

What is claimed is:

1. A method for securely processing transactions in an aircraft, comprising:
    transmitting, by a user device in the aircraft using a wireless protocol, (a) a first authentication factor encrypted using a symmetric cryptographic algorithm and (b) a request for one or more on-board services, wherein keys for the symmetric cryptographic algorithm are known only to the user device and a financial institution that a user of the user device has an account with;
    receiving, from an on-board transceiver using the wireless protocol, an authentication token (a) comprising a one-time code and (b) encrypted using an asymmetric cryptographic algorithm;
    transmitting, using the asymmetric cryptographic algorithm, a second authentication factor comprising (a) the authentication token and (b) a text message transmitted from the user device; and
    receiving a confirmation of a delivery of the one or more on-board services,
    wherein the on-board transceiver is operable to relay the first authentication factor and the second authentication factor to a ground network using the wireless protocol, and
    wherein payment for the one or more on-board services is authorized prior to providing the one or more on-board services to the user.

2. The method of claim 1, wherein the first authentication factor is a credit card number.

3. The method of claim 1, further comprising:
    receiving, from the on-board transceiver, a request for the payment.

4. The method of claim 1, wherein the wireless protocol is a Fifth Generation (5G) cellular protocol, and wherein the on-board transceiver comprises a 5G picocell.

5. A method for securely processing transactions in an aircraft, comprising:
    receiving, from a user device in an aircraft using a wireless protocol, a request for one or more on-board services;
    transmitting, by an on-board transceiver using the wireless protocol, a request for payment;
    relaying, from the user device to a ground network using the wireless protocol, a first authentication factor encrypted using a symmetric cryptographic algorithm, wherein keys for the symmetric cryptographic algorithm are known only to the user device and a financial institution that a user of the user device has an account with;
    relaying, from the ground network to the user device, an authentication token comprising a one-time code, wherein the authentication token is encrypted using an asymmetric cryptographic algorithm;
    relaying, from the user device to the ground network, a second authentication factor that (a) is encrypted using the asymmetric cryptographic algorithm and (b) comprises a text message transmitted from the user device and the authentication token;
    receiving, from the ground network, a payment authorization; and
    transmitting, to the user device in response to receiving the payment authorization, a confirmation of a delivery of the one or more on-board services.

6. The method of claim 5, wherein the first authentication factor is a credit card number.

7. The method of claim 5, wherein the wireless protocol is a Fifth Generation (5G) cellular protocol, and wherein the on-board transceiver comprises a 5G picocell.

8. An apparatus for securely processing transactions in an aircraft, comprising:
    a processor; and
    a non-transitory memory with instructions thereon, wherein the instructions upon execution by the processor cause the processor to:
        receive, from a user device in an aircraft using a wireless protocol, a request for one or more on-board services;
        transmit, by an on-board transceiver using the wireless protocol, a request for payment;
        relay, from the user device to a ground network using the wireless protocol, a first authentication factor encrypted using a symmetric cryptographic algorithm, wherein keys for the symmetric cryptographic algorithm are known only to the user device and a financial institution that a user of the user device has an account with;
        relay, from the ground network to the user device, an authentication token comprising a one-time code, wherein the authentication token is encrypted using an asymmetric cryptographic algorithm;
        relay, from the user device to the ground network, a second authentication factor that (a) is encrypted using the asymmetric cryptographic algorithm and (b) comprises a text message transmitted from the user device and the authentication token;
        receive, from the ground network, a payment authorization; and
        transmit, to the user device in response to receiving the payment authorization, a confirmation of a delivery of the one or more on-board services.

9. The apparatus of claim 8, wherein the symmetric cryptographic algorithm comprises one of an Advanced Encryption Standard (AES) cipher, an RC4 stream cipher, or a Twofish block cipher.

10. The apparatus of claim 8, wherein the wireless protocol is a Fifth Generation (5G) cellular protocol, and wherein the on-board transceiver comprises a 5G picocell.

11. The apparatus of claim 10, wherein the ground network comprises a 5G router.

12. The apparatus of claim 8, wherein the asymmetric cryptographic algorithm comprises one of a Diffie-Hellman key exchange protocol, a cryptosystem based on elliptic curves, an RSA encryption algorithm, or a Paillier cryptosystem.

13. A non-transitory computer-readable medium having data stored therein representing software executable by a computer, the software comprising instructions for securely processing transactions in an aircraft, the non-transitory computer-readable medium comprising:

instructions for transmitting, by a user device in the aircraft using a wireless protocol, a first authentication factor and a request for one or more on-board services, wherein the first authentication factor is encrypted using a symmetric cryptographic algorithm, and wherein keys for the symmetric cryptographic algorithm are known only to the user device and a financial institution that a user of the user device has an account with;

instructions for receiving, from an on-board transceiver using the wireless protocol, an authentication token (a) comprising a one-time code and (b) encrypted using an asymmetric cryptographic algorithm;

instructions for transmitting, using the second cryptographic algorithm, a second authentication factor comprising (a) the authentication token and (b) a text message transmitted from the user device; and instructions for receiving a confirmation of a delivery of the one or more on-board services, wherein the on-board transceiver is operable to relay the first authentication factor and the second authentication factor to a ground network using the wireless protocol, and wherein payment for the one or more on-board services is authorized prior to providing the one or more on-board services to the user.

14. The non-transitory computer-readable medium of claim 13, wherein the first authentication factor is a credit card number.

15. The non-transitory computer-readable medium of claim 13, wherein the non-transitory computer-readable medium further comprises:

instructions for receiving, from the on-board transceiver, a request for the payment.

16. The non-transitory computer-readable medium of claim 13, wherein the wireless protocol is a Fifth Generation (5G) cellular protocol, wherein the on-board transceiver comprises a 5G picocell, and wherein the ground network comprises a 5G router.

17. The non-transitory computer-readable medium of claim 13, wherein the symmetric cryptographic algorithm comprises one of an Advanced Encryption Standard (AES) cipher, an RC4 stream cipher or a Twofish block cipher.

18. The non-transitory computer-readable medium of claim 13, wherein the asymmetric cryptographic algorithm comprises one of a Diffie-Hellman key exchange protocol, a cryptosystem based on elliptic curves, an RSA encryption algorithm or a Paillier cryptosystem.

19. The method of claim 1, wherein the symmetric cryptographic algorithm comprises one of an Advanced Encryption Standard (AES) cipher, an RC4 stream cipher, or a Twofish block cipher.

20. The method of claim 1, wherein the asymmetric cryptographic algorithm comprises one of a Diffie-Hellman key exchange protocol, a cryptosystem based on elliptic curves, an RSA encryption algorithm, or a Paillier cryptosystem.

* * * * *